United States Patent [19]

Suzuki et al.

[11] Patent Number: 5,031,107

[45] Date of Patent: Jul. 9, 1991

[54] NUMERICAL CONTROL APPARATUS FOR MACHINING NON-CIRCULAR WORKPIECES

[75] Inventors: Ikuo Suzuki, Chiryu; Takao Yoneda, Nagoya, both of Japan

[73] Assignee: Toyoda Koki Kabushiki Kaisha, Kariya, Japan

[21] Appl. No.: 331,964

[22] Filed: Apr. 3, 1989

[30] Foreign Application Priority Data

Apr. 5, 1988 [JP] Japan .................................. 63-83424

[51] Int. Cl.$^5$ ............................................ G06F 15/46
[52] U.S. Cl. .......................... 364/474.28; 364/474.29; 364/474.14; 318/571
[58] Field of Search ............... 364/474.36, 475, 474.06, 364/474.28, 474.14, 474.29, 474.30; 51/165.71; 318/568–571

[56] References Cited

U.S. PATENT DOCUMENTS

| | | |
|---|---|---|
| 3,344,559 | 10/1967 | Inaba et al. |
| 3,482,357 | 12/1969 | Inaba et al. |
| 3,917,930 | 11/1975 | Davey et al. |
| 4,206,393 | 6/1980 | Chiba. |
| 4,400,781 | 8/1983 | Hotta et al. ...................... 364/474.06 |
| 4,501,093 | 2/1985 | Fisher ................................ 51/165.71 |
| 4,564,914 | 1/1986 | Ballough et al. ...................... 364/475 |
| 4,791,575 | 12/1988 | Watts, Jr. et al. ............. 364/474.36 |

Primary Examiner—Jerry Smith
Assistant Examiner—Paul Gordon
Attorney, Agent, or Firm—Oblon, Spivak, McClelland, Maier & Neustadt

[57] ABSTRACT

A numerical control apparatus for machining non-circular workpieces such as a cam and the like is disclosed. In the present invention, roughing profile data and finishing profile data are generated from lift data regulating the shape of non-circular workpiece. The roughing profile data are obtained from roughing lift data. The roughing lift data are generated as changing smoothly such that the deviation from the lift data regulating the finished shape presents within the tolerance of allowance at finishing, and quadratic differential components related to the rotational angle are smaller than the predetermined value. Machinings are performed by the roughing profile data at roughing and by the finishing profile data at finishing. As a result, the high-speed machinings are possible and the machining cycle time can be shortened.

9 Claims, 9 Drawing Sheets

FIG. 8A cam base circle redius | lift amount $\Delta X(\theta)$

NUMERICAL CONTROL APPARATUS FOR
MACHINING NON-CIRCULAR WORKPIECES

BACKGROUND OF THE INVENTION

The present invention relates to a numerical control apparatus for controlling machining of non-circular workpieces (hereinafter merely referred to as a workpiece) such as a cam and the like.

Conventionally, a process for grinding the workpiece such as the cam by controlling a feed of grinding wheel, the direction of which is perpendicular to a main spindle, with the numerical control apparatus in synchronism with the rotation of the main spindle is known. It is necessary to provide profile data to the numerical control apparatus for synchronizing control of the grinding wheel feed. The profile data provide the feed amount of the grinding wheel per a unit rotational angle of the main spindle so as to reciprocate the grinding wheel, that is to give it the profile creating motion along the finished shape of the workpiece.

Though the profile data are obtained from lift data of the non-circular workpiece and the grindstone diameter, the only common profile data are used from the roughing to finishing.

Since the profile data decided from the finished shape realize the finished shape faithfully in such a manner, quadratic differential components or acceleration components related to the angle are largely contained.

However, from the frequency characteristic restriction of response of the servo system, the more the large acceleration components are contained, the slower must be the machining speed for the faithful machining. That is, in order to minimize the follow-up error, the machining speed must be reduced to improve the servo system response.

When the machining speed is reduced, however, such a problem is encountered that cracks are produced in the workpiece by heating, and the slow machining speed naturally results in a poor manufacturing efficiency.

While, if the finishing profile data decided by the only finished data are used for the high-speed roughing, the feed position of the grinding wheel can not follow the command in the place where the acceleration is large, remaining the large uncut area. In this case, in the finishing performed at low-speed to improve the surface accuracy of the machining surface, since the feed amount of the grinding wheel is determined on the basis of the largest uncut area, the finishing takes much time. That is, there is no big difference on the cycle time with the case where the roughing was performed slowly from the beginning.

Since the command value is not followed when the roughing is performed at fast speed, in the worst case, over cutting is occurred and no finishing allowance is left, results in rejects.

SUMMARY OF THE INVENTION

The present invention is devised to solve the aforesaid problems, therefore, it is an object thereof, at roughing, to prevent cracks of a workpiece caused by heating on account of the high-speed rotation of a main spindle.

It is another object of the present invention to shorten the cycle time and improve the manufacturing efficiency by high-speed roughing.

It is a further object of the present invention to improve the machining accuracy by uniforming the finishing allowance as much as possible.

In order to attain the objects aforementioned, in the present invention, the roughing profile data and finishing profile data are obtained respectively to perform the roughing and finishing by respective profile data.

The shape of a non-circular workpiece is, in case of a cam, given by lift data showing the relationship between the rotational angle of the cam and the lift amount of a tappet contacting the cam. The lift data is decided by the operating characteristics of the cam and given in sequence of points of the lift amount at a number of discrete rotational angles. In this case, when the tappet is a flat tappet, the lift data by the flat tappet is converted into the lift data by the polar coordinates representing the relationship of the normal vector of a point on the contour line at angle $\theta$ with respect to the angle $\theta$. Thus, the lift data is, for example, given by the sequence of points $r(\theta_1)$, $r(\theta_2)$, $r(\theta_3)$, ... $r(\theta_w)$ at every 0.5°. Hereinafter, the lift data signifies data represented by the polar coordinates.

By using the lift data consisting of the sequence of points, the roughing lift data given by the sequence of points which changes smoothly such that deviations for the finished shape present within a tolerance of finishing allowance, and the quadratic differential of a feed position of a tool-feed shaft relative to the main spindle rotational angle, namely, the acceleration becomes lower than the set valve are obtained. The smooth roughing lift data are obtained, for example, in the following manner. From the lift data present in a constant angle area $D_i$ ($\theta_i - \Delta \leq D_i \leq \theta_i + \Delta$), lift data at n points are extracted to obtain a regression curve which approximates the lift data smoothly by the regression polynomial $f_i(\theta)$. Next, value $f_i(\theta_i)$ at the central angle $\theta_i$ on the regression curve is obtained as the roughing lift data at angle $\theta_i$. Then, the angle $\theta_i$ and angle area $D_i$ are shifted by a unit angle, for example, 0.5° to obtain the regression curve similarly for obtaining the roughing lift data at next angle $\theta_i$. By repeating the above processings, the roughing lift data are given as the sequence $f_1(\theta_1)$, $f_2(\theta_2)$, ..., $f_z(\theta_z)$. Then, it is determined whether the deviation for the finished shape is below the tolerance of finishing allowance, or satisfies $|r(\theta_k) - f_k(\theta_k)| \leq \epsilon$ for all data. It is also determined whether the acceleration components of the roughing lift data are smaller than the set value for all data. When the aforesaid conditions are not satisfied, angle area $D_i$ is reduced or enlarged to decrease or increase the number n of sequence of points extracted in the angle area $D_i$, or point sequence data are thinned out suitably, or repeating the aforesaid processings by increasing or decreasing order of the regression polynomial to obtain the roughing lift data which satisfy the two conditions aforementioned. That is, by the number of points of the approximating point sequence and the order of regression polynomial, the smoothness of point sequence of the roughing lift data generated and deviation for the finished shape can be changed.

Thereafter, from the roughing lift data, the roughing profile data regulating the grinding wheel feed position relative to the rotational angle are prepared.

Also, from the lift data specifying the finished shape and the grindstone diameter, finishing profile data regulating the grinding wheel position relative to the rotational angle are prepared. On the basis of the roughing profile data or finishing profile data aforementioned, positions of the main spindle and the tool-feed shaft are controlled in synchronism to allow roughing or finishing of a non-circular workpiece by using respective profile data exclusively.

DESCRIPTION OF THE INVENTION

Figure 1:
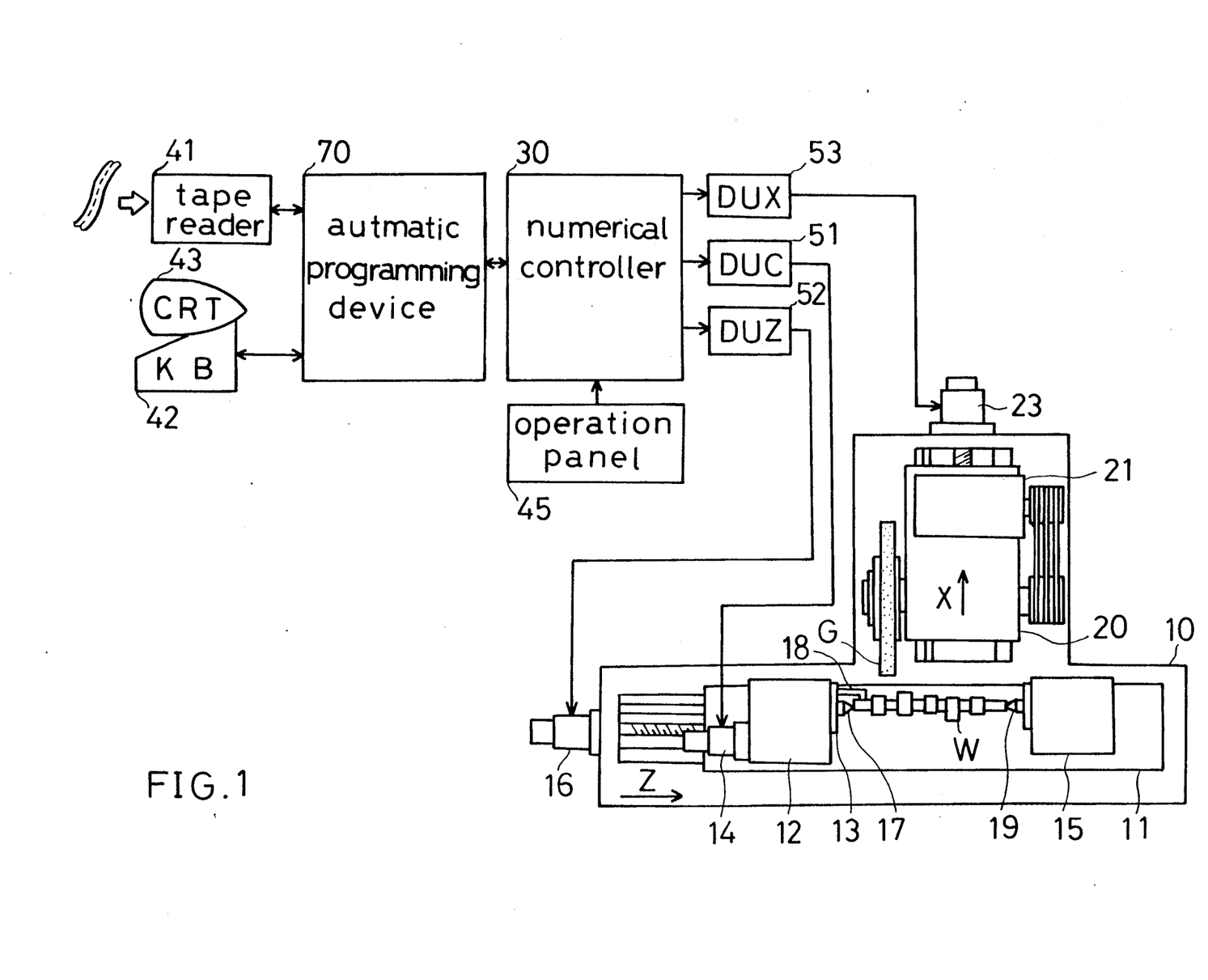
FIG. 1 is a block diagram showing a numerical control grinding machine according to the embodiment of the present invention.

The present invention will be described in response to a specific embodiment as follows. In FIG. 1, the numeral 10 indicates a bed of a numerical control grinding machine, whereon a table 11 which is driven by a servo motor 16 via a feed-screw mechanism is disposed slidably in the direction of z-axis which is in parallel to a main spindle axis. On the table 11, a head-stock 12 supporting a main spindle 13 driven by a servo motor 14 is provided. On the right end of the table 11, a tail-stock 15 is mounted, and a workpiece W consisting of a cam-shaft is clamped by a center 19 of the tail-stock 15 and a center 17 of the main spindle 13. The workpiece W is engaged to a positioning pin 18 projected from the main spindle 13 to be locked in a phase of rotation to the main spindle 13.

Behind the bed 10, a wheel head 20 which is movable back and forth toward the workpiece W is guided and provided with a grinding wheel G driven by a motor 21. The wheel head 20 is coupled to a servo motor 23 via a feed screw 22, and moved back and forth by the normal and reverse rotation of the servo motor 23.

Drive units 51, 52 and 53 are circuit for receiving command pulses from a numerical controller 30 to drive the servo motors 14, 16 and 23 respectively.

Figure 2:
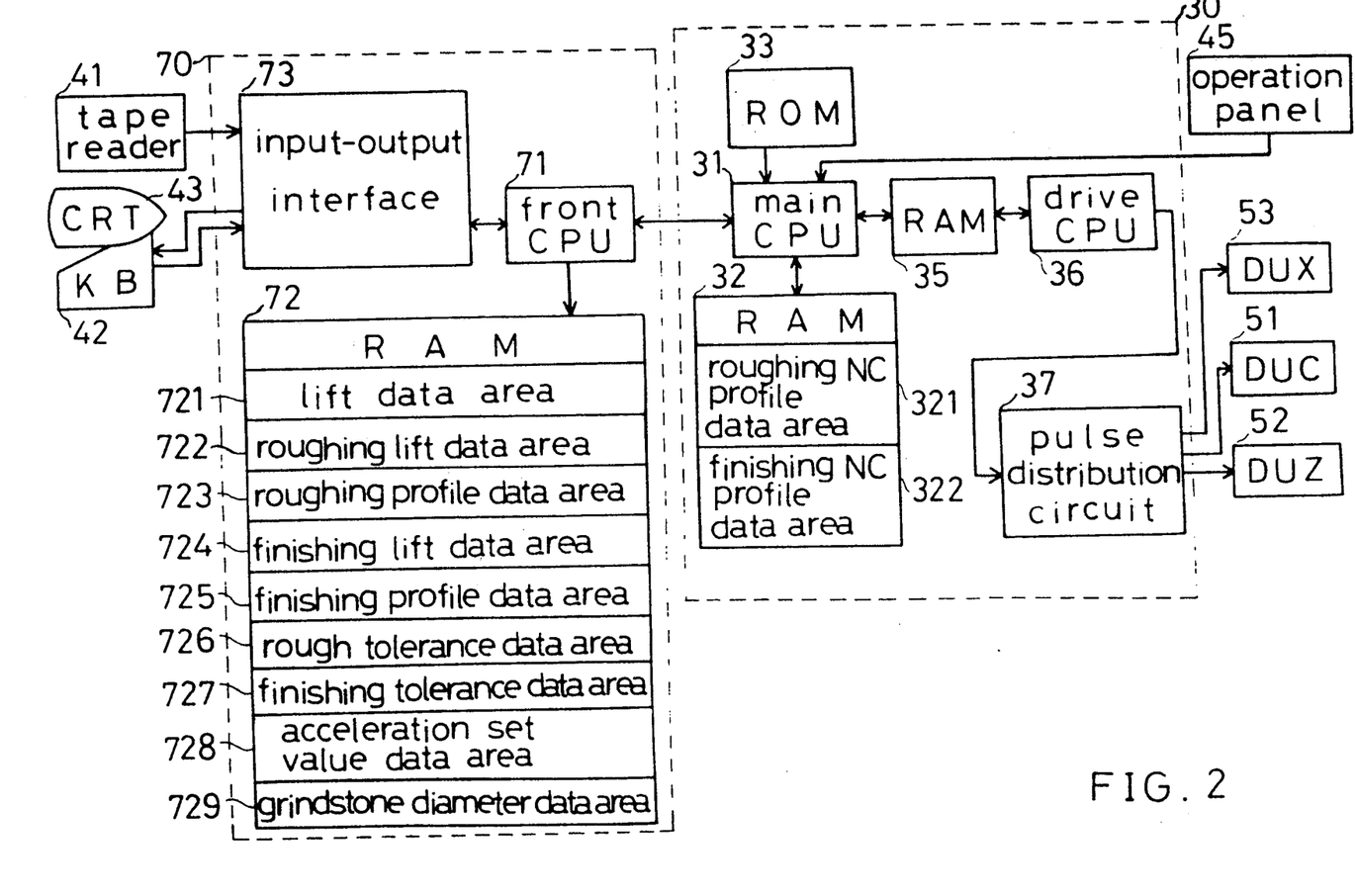
FIG. 2 is a block diagram showing an electrical configuration of a numerical control apparatus.

The numerical controller 30 mainly controls the rotation of the control axes numerically to control grinding of the workpiece W and dressing the surface of the grinding wheel G. As shown in FIG. 2, the numerical controller 30 mainly comprises a main CPU31 for controlling the grinding machine, a ROM33 storing the control program and a RAM32 storing input data. On the RAM32, a roughing NC profile data area 321 and finishing NC profile data area 322 for storing the NC profile data are formed.

As driving systems of the servo motors 14, 16 and 23, a drive CPU36, a RAM 35 and a pulse distribution circuit 37 are provided in the numerical controller 30. The RAM35 is a memory to which positioning data of the grinding wheel G, table 11 and main spindle 13 are inputted from the main CPU31.

The drive CPU36 calculates the process of the slow-up, slow-down and interpolation to the target point with respect to control axes related to machining, and outputs positioning data of the interpolation points periodically, and the pulse distribution circuit 37 outputs operation command pulses to respective drive units 51, 52 and 53 after the pulse distribution.

An automatic programming device 70 connected to the numerical controller 30 generates profile data automatically from the lift data and grindstone diameter, and comprises a front CPU71, a RAM72 and an input-output interface 73. In the RAM72, a lift data area 721 storing the lift data of a plurality of workpieces, a roughing lift data area 722 storing roughing lift data generated from the lift data, a roughing profile data area 723 storing roughing profile data generated from the roughing lift data, a finishing lift data area 724 storing finishing lift data generated from the lift data, a finishing profile data area 725 storing finishing profile data generated from the finishing lift data, a rough tolerance data area 726 storing a tolerance of finishing allowances at finishing of the workpiece, namely, the upper deviation limit of the roughing shape for the finished shape as the rough tolerance, a finishing tolerance data area 727 storing allowable errors at finishing for the finished shape of the workpiece as a finishing tolerance, an acceleration set value data area 728 storing a present upper limit value of the acceleration of the tool-feed shaft relative to the rotational angle of the main spindle decided from follow-up performances of the servo system for allowing the smooth machining, and grindstone diameter data area 729 storing the current grindstone diameter when generating the profile data are formed.

To the front CPU71, a tape reader 41 which inputs lift data etc., a key-board 42 for inputting the data and a CRT display 43 for displaying the data are connected via the input-output interface 73.

Now, the operation will be described as follows.

When the present apparatus is set in the data input mode, all lift data necessary for machining are read from the tape reader 41 by the front CPU71 via the input-output interface 73 and stored in the lift data area 721.

Figure 8A:
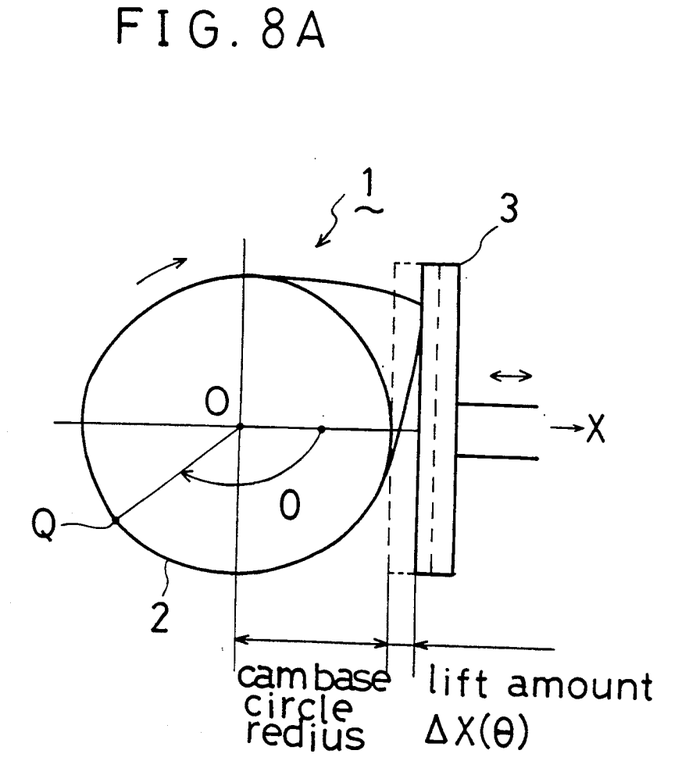
FIG. 8A is an explanatory view for illustrating the lift amount of a flat tappet relative to the rotational angle of a cam.
Figure 8B:
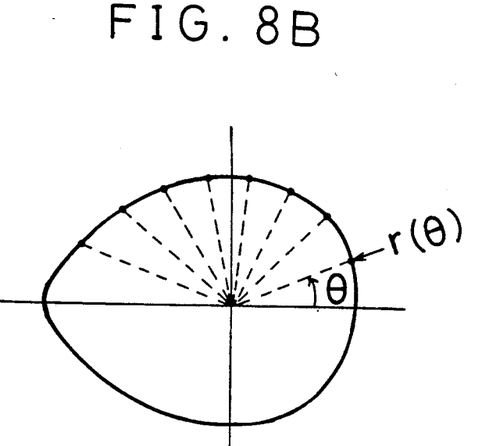
FIG. 8B is an explanatory view for illustrating polar coordinates lift data.

As shown in FIG. 8A, the lift data, when the flat tappet is used, is represented by a moving amount or a lift amount of the flat tappet 3 which is contacted to the cam 1 and movable in the direction of x-axis according to the rotation of the cam 1. Thus, if the rotational angle $\theta$ of the cam 1 is defined by the rotational angle of the reference point Q on a base circle 2, the lift amount $\Delta X(\theta)$ is obtained as a function of $\theta$. The lift data to be inputted is given, for example, in point sequence of the lift amount $\Delta X(\theta)$ at every rotational angle of 0.5°. Since the contact position on the flat tappet 3 to the cam 1 varies responsive to the rotation of the cam 1, the lift data by the flat tappet do not become the point sequence at every equicentral angle on the contour line of the cam 1. Therefore, the lift data by the flat tappet must be, as shown in FIG. 8B, converted into polar coordinate lift data obtained by specifying the point sequence on the contour line of the cam 1 by the central angle $\theta$ and the radius length $r(\theta)$. The polar coordinate lift data are converted from the lift data by the flat tappet taking into account of the relative contact between the flat tappet 3 and the cam 1 shown in FIG. 8A. The lift data by a knife-edge tappet are the polar coordinate lift data. Thus, in the present embodiment, all lift data stored in the lift data area 721 have been converted into the polar coordinate lift data, and the lift data are standing for the polar coordinate lift data.

Figure 3:
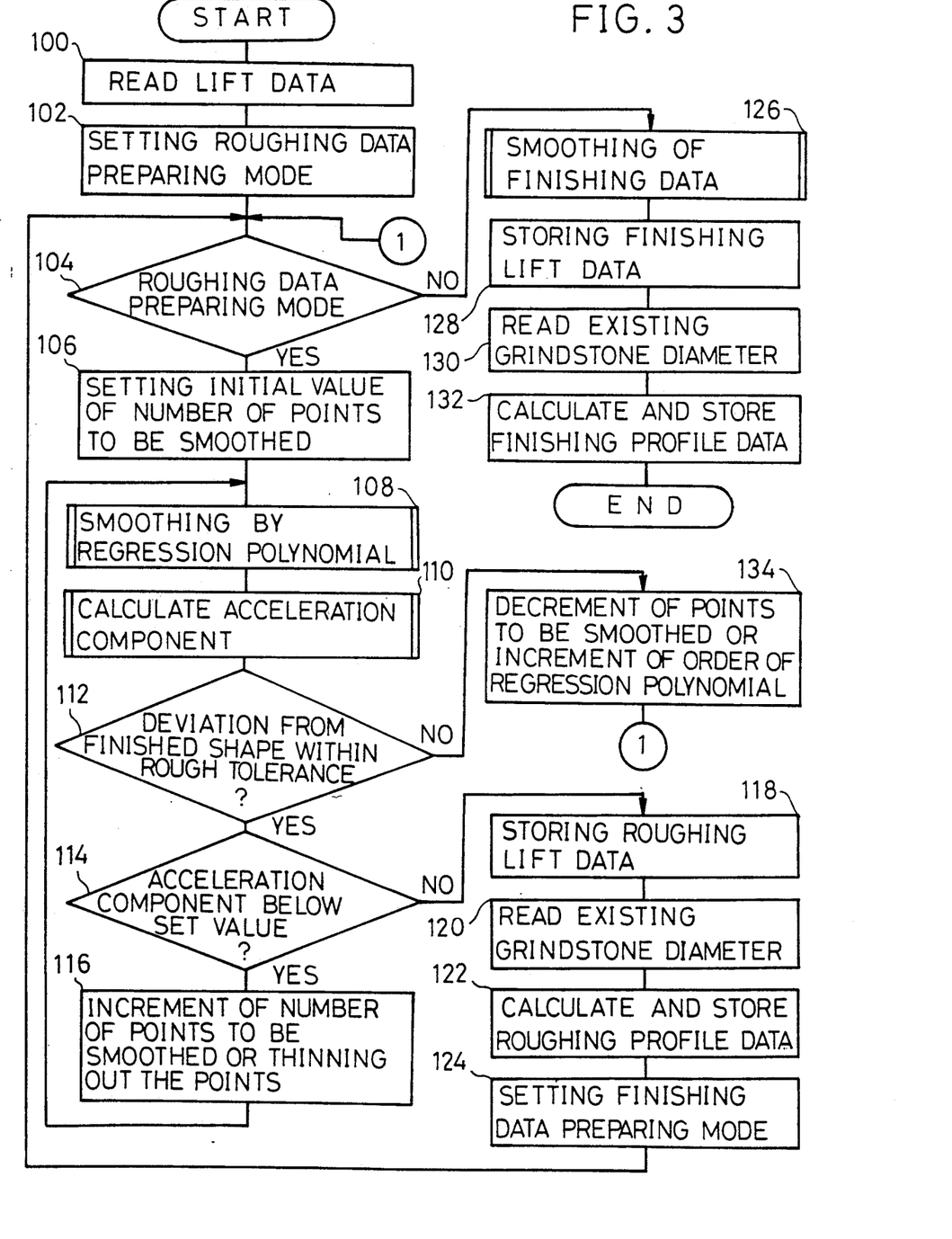
FIG. 3 is a flow chart showing processing procedures of a front CPU71 when a profile data preparing mode is set.

Next, when the apparatus is set in the profile data preparing mode, first the front CPU71 executes the program of FIG. 3.

In Step 100, the lift data stored in the lift data area 721 are read.

Then, the CPU71 moves its procedure to Step 102 and the present apparatus is set in the roughing data preparing mode by input from the key-board 42.

Next, the CPU71 moves to Step 104 and then to Step 106 if it is the roughing data preparing mode, and dimensions of a certain angle area $D_i$ when the lift data being formed into the point sequence are approximated by a smooth curve are initialized, and the extracted number of points of the lift data in the area, namely, the number of points to be smoothed are initialized to all points n in the area.

Then, the CPU71 moves its procedure to Step 108 to execute the smoothing process of the lift data.

Figure 4:
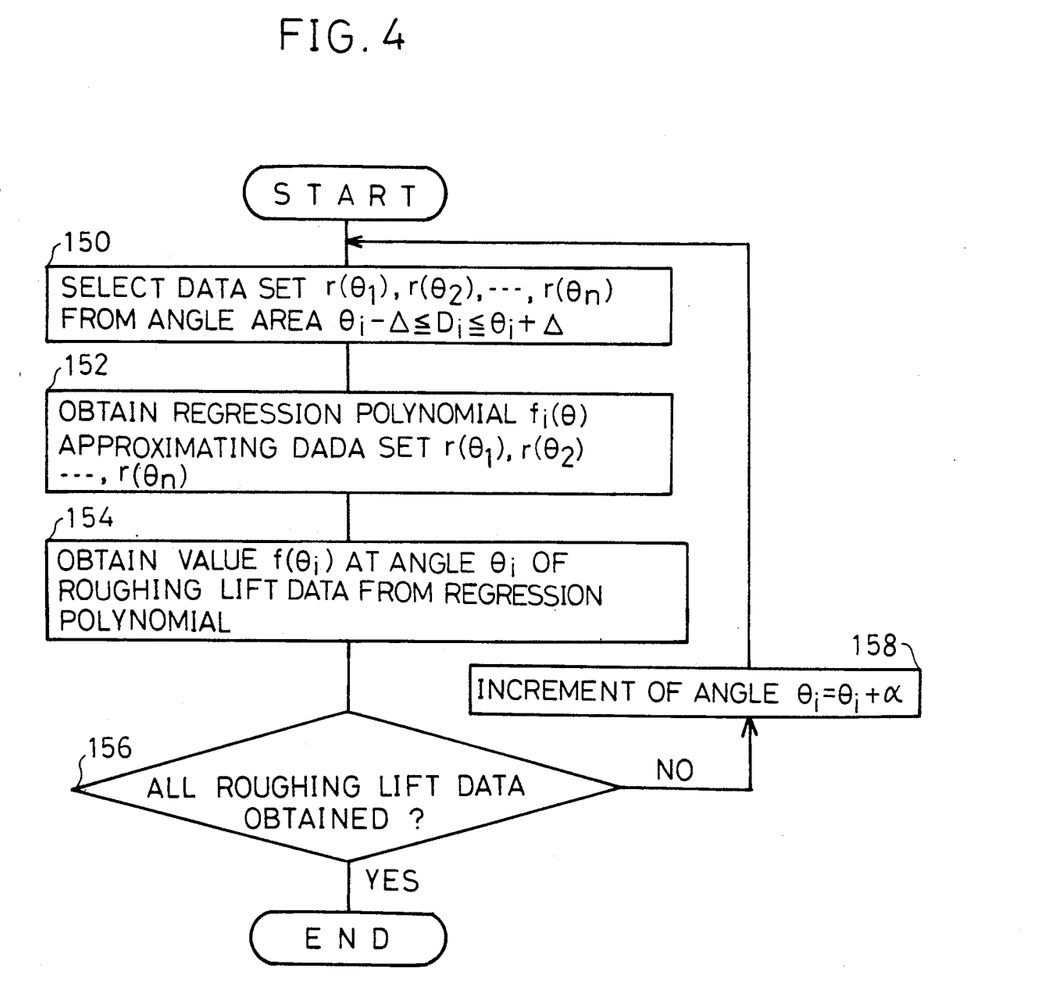
FIG. 4 is a flow chart showing smoothing processing procedures by a front CPU71.
Figure 9:
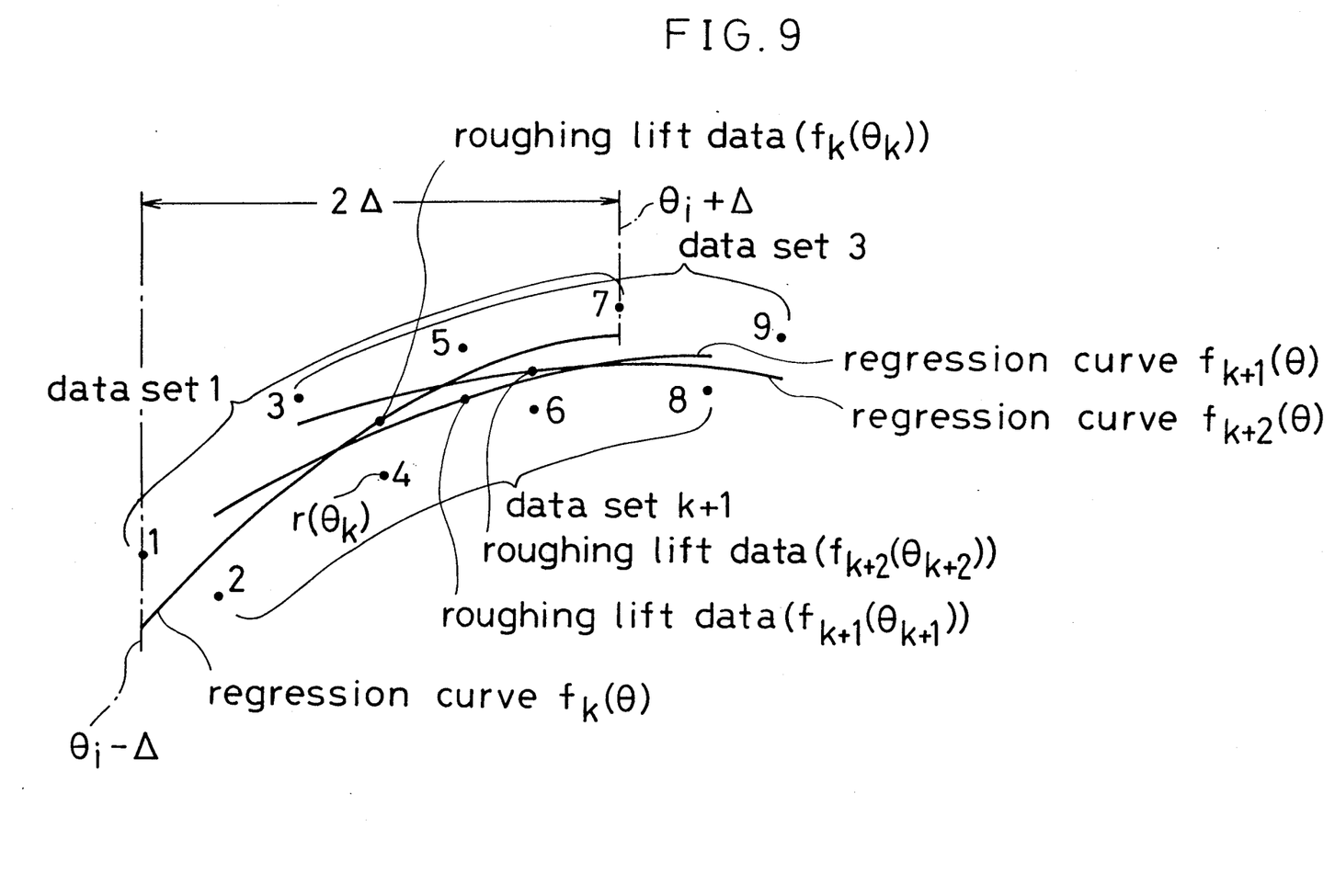
FIG. 9 is an explanatory view for illustrating a smoothing method of lift data.

Next, the smoothing procedures will be described with reference to a flow chart of FIG. 4 and FIG. 9 showing its outline.

In Step 150, from the lift data in the angle area $D_i$ ($\theta_i - \Delta \leq D_i \leq \theta_i + \Delta$) (normally $\Delta = 10°$) about the angle $\theta_i$ for obtaining the smoothed lift data, data set $r(\theta_1), r(\theta_2), \ldots, r(\theta_n)$ of the number of points n to be smoothed is selected.

Then, the CPU71 moves its procedure to Step 152, wherein regression analysis by the least square approximation is performed against the selected data sets.

$$f(\theta) = a_0 + a_1\theta + a_2\theta^2 + \ldots + a_m\theta^m \quad (1)$$

Where, $a_0, a_1, a_2, \ldots, a_m$ are regression coefficients and m is an order of regression polynomial.

Between the data set $r(\theta_1), r(\theta_2), \ldots, r(\theta_n)$ and regression polynomial $f(\theta)$, the following matrix equation is established.

$$R = X \cdot A + E \quad (2)$$

Where, $$R = \begin{pmatrix} r(\theta_1) \\ r(\theta_2) \\ \vdots \\ r(\theta_n) \end{pmatrix} \quad (3)$$

$$X = \begin{pmatrix} 1 & \theta_1 & \theta_1^2 & \ldots & \theta_1^m \\ 1 & \theta_2 & \theta_2^2 & \ldots & \theta_2^m \\ \vdots & \vdots & \vdots & & \vdots \\ 1 & \theta_n & \theta_n^2 & \ldots & \theta_n^m \end{pmatrix} \quad (4)$$

$$A = \begin{pmatrix} a_0 \\ a_1 \\ \vdots \\ a_m \end{pmatrix} \quad (5)$$

$$E = \begin{pmatrix} e_1 \\ e_2 \\ \vdots \\ e_n \end{pmatrix} \quad (6)$$

The element $e_k$ of the matrix E means an error between the function value $f(\theta_k)$ and the data $r(\theta_k)$.

From Eq. (2), we get $$E = R - X \cdot A \quad (7)$$

and $$E^t = R^t - A^t \cdot X^t \quad (8)$$

Where $E^t$, $R^t$, $A^t$ and $X^t$ are the transposed matrices of the matrices E, R, A, and X, respectively.

Therefore, from Eqs. (7) and (8), square sum g of the errors is given by $$g = e_1^2 + e_2^2 + \ldots + e_n^2 = E^t \cdot E = (R^t - A^t X^t)(R - XA) \quad (9)$$
$$= R^t R - A^t X^t R - R^t XA + A^t X^t XA$$

The conditions for minimizing the square sum g are $$\frac{\delta g}{\delta A} = \begin{pmatrix} \frac{\delta g}{\delta a_0} \\ \frac{\delta g}{\delta a_1} \\ \vdots \\ \frac{\delta g}{\delta a_m} \end{pmatrix} = \begin{pmatrix} 0 \\ 0 \\ \vdots \\ 0 \end{pmatrix} \quad (10)$$

When we differentiate Eq. (9) by A, we get $$\delta g/\delta A = -X^t R - (R^t X)^t + X^t XA + (A^t X^t X)^t \quad (11)$$
$$= -X^t R - X^t R + X^t XA + X^t XA$$
$$= -2X^t R + 2X^t XA$$

From $\delta g/\delta A = 0$, we get $$2X^tXA = 2X^tR$$

then $$A = (X^tX)^{-1} \cdot X^t \cdot R \quad (12)$$

where $(X^tX)^{-1}$ is the inverse matrix of $X^tX$.

From equation (12), the regression coefficient of regression polynomial $f(\theta)$ can be obtained.

In such a manner, the regression polynomial which approximates the data set $r(\theta_1)$, $r(\theta_2)$, ..., $r(\theta_n)$ smoothly, thus the regression curve defined by the regression polynomial is obtained.

The regression polynomial is designated at $f_i(\theta)$ as corresponding to the angle area $D_i$.

Next, the CPU71 moves its procedure to Step 154 to generate roughing lift data at angle $\theta_i$ from the regression polynomial $f_i(\theta)$ by the functional value $f_i(\theta_i)$ at angle $\theta_i$.

Then, the CPU71 moves to Step 156 to determine whether all roughing lift data are generated, if not, moves to Step 158, wherein the roughing lift data generating angle $\theta_i$ is increased by $\alpha(=0.5°)$ and the angle area $D_i$ is shifted by $\Delta$. The CPU71 then returns its procedure to Step 150 to repeat the aforesaid processings until it is determined that all roughing lift data are generated in Step 156, when it is determined that all roughing lift data are generated in Step 156, the roughing lift data are obtained as, $f_1(\theta_1)$, $f_2(\theta_2)$, $f_3(\theta_3)$, ..., $f_z(\theta_z)$.

Next, the CPU71 moves its procedure to Step 110 in FIG. 3, wherein quadratic differential relative to the angle $\theta$, or the acceleration component $J(\theta)$ is calculated from the roughing lift data aforementioned.

Where, acceleration at angle $\theta_i$ in case of a uniform angular pitch is, $$J(\theta_i) = \{f_{i+2}(\theta_{i+2}) - 2f_{i+1}(\theta_{i+1}) + f_i(\theta_i)\}/\Delta^2 \quad (13)$$

The CPU71 then moves its procedures to Step 112 to calculate the deviation between the resulting roughing lift data $f_1(\theta_1)$, $f_2(\theta_2)$, ..., $f_z(\theta_z)$ and lift data $r_1(\theta_1)$, $r_2(\theta_2)$, ..., $r_z(\theta_z)$ at respective angles. It is then determined whether the deviations are all within the rough tolerance stored in the rough tolerance data area 726. The rough tolerance indicates the upper deviation limit value of the roughing shape relative to the finished shape, and is decided from time restrictions required for finishing, load restrictions applied to the grindstone at finishing and the surface accuracy. That is, the deviations which are zero everywhere signify that the roughing shape by roughing lift data is completely as same as the finished shape, and the finishing allowance then becomes a constant value H as shown in FIG. 8D irrespective of the angle. On the contrary, in the present invention, as shown in FIG. 8D, variations of the finishing allowance are allowed between $H-\epsilon$ and $H+\epsilon$.

When the deviations are not within the tolerance, it means that the roughing shape is largely deviated from the finishing shape by over-smoothing Thus, in this case, the CPU71 moves its procedure to Step 134 to decrease the number n of the points to be smoothed by narrowing the angle area $D_i$, or increasing the order of the regression polynomial and obtaining the regression polynomial again to prepare the roughing lift data.

While, if the deviations at all angles are determined to present within the rough tolerance, the CPU71 moves its procedure to Step 114 to determine whether the accelerations $J(\theta)$ at all angles calculated in Step 110 are within the acceleration set value stored in the acceleration set value data area 728.

When the lift data acceleration is large, since high-speed grinding is not possible from the follow-up performance restriction of the servo system, the acceleration must be restricted to enable the high-speed grinding.

Accordingly, the set value of judgement criterion is determined by the time restriction required for roughing and the follow-up restriction of the servo system.

As nonexistence of acceleration components in the set value signifies that the lift data is over approximated faithfully and there is no smoothness, the CPU71 moves to Step 116 to increase the number n of the points to be smoothed by enlarging the angle area $D_i$, or thinning out the point sequences at equal intervals or suitable at locations where the rate of change of the cam shape is large, then returns to Step 108 wherein the regression curve approximated by the regression polynomial is obtained again.

Figure 7:
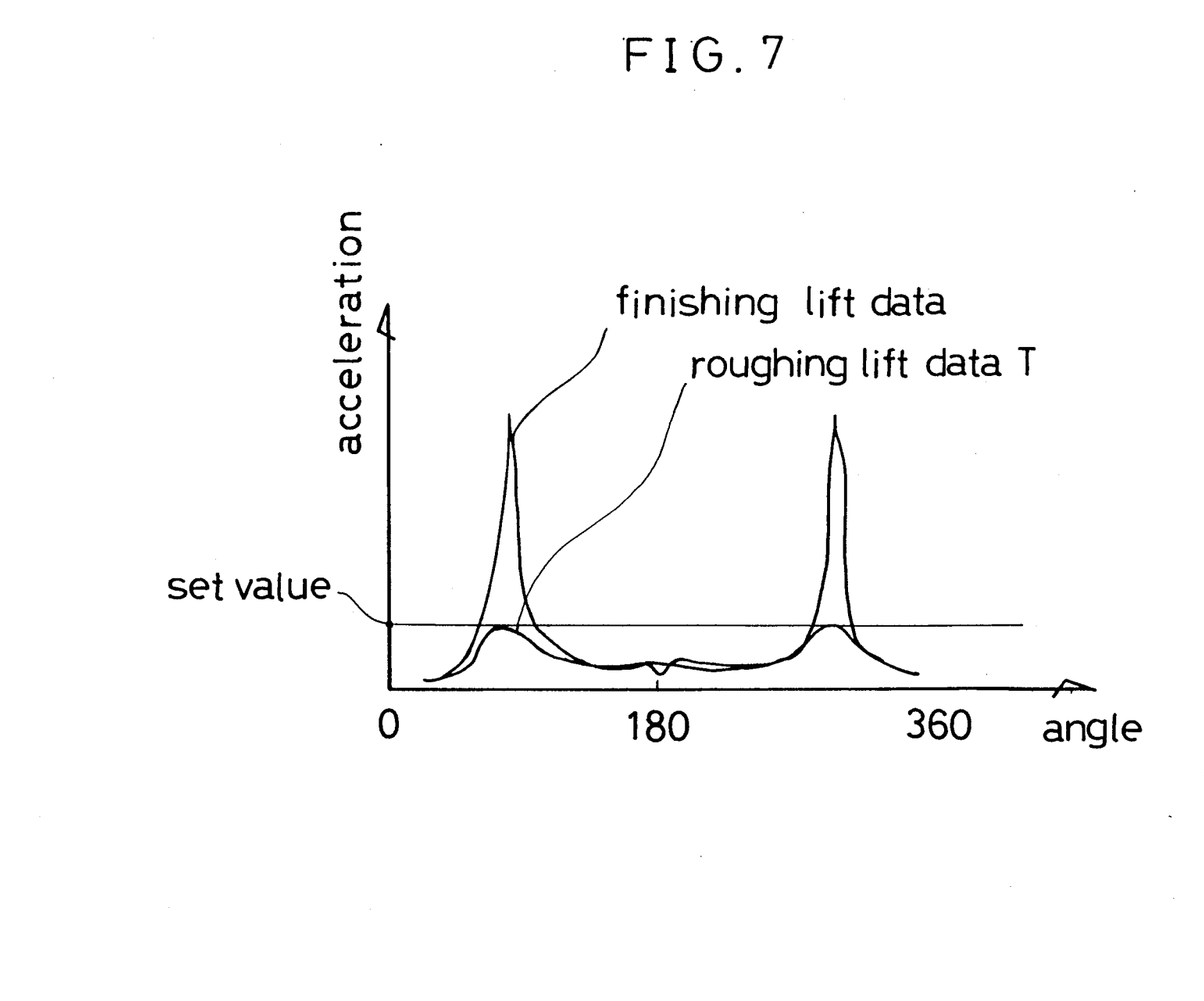
FIG. 7 is a characteristic diagram showing the difference of acceleration components in roughing lift data and finishing lift data.

As such, when it is determined YES in Step 112, namely, in the state wherein a condition is met that deviations at respective points between the curve obtained and the point sequence lift data are within the rough tolerance, procedures from Step 108 to Step 116 are repeated until it is determined in Step 114 that the acceleration components are in the set value, for example, until the acceleration components show a curve T which is below the set value in FIG. 7.

When it is determined that the deviations are within the rough tolerance and the acceleration components are in the set value, the CPU71 moves its procedure to Step 118 to store resulting roughing lift data $f_1(\theta_1)$, $f_2(\theta_2)$, ..., $f_z(\theta_z)$ in the roughing lift data area 722.

Next, the CPU71 moves its procedure to Step 120 to read the existing grindstone diameter stored in the grindstone diameter data area 729, and moves to Step 122, wherein roughing profile data are calculated from the existing grindstone diameter and the roughing lift data stored in the roughing lift data area 722.

Figure 8C:
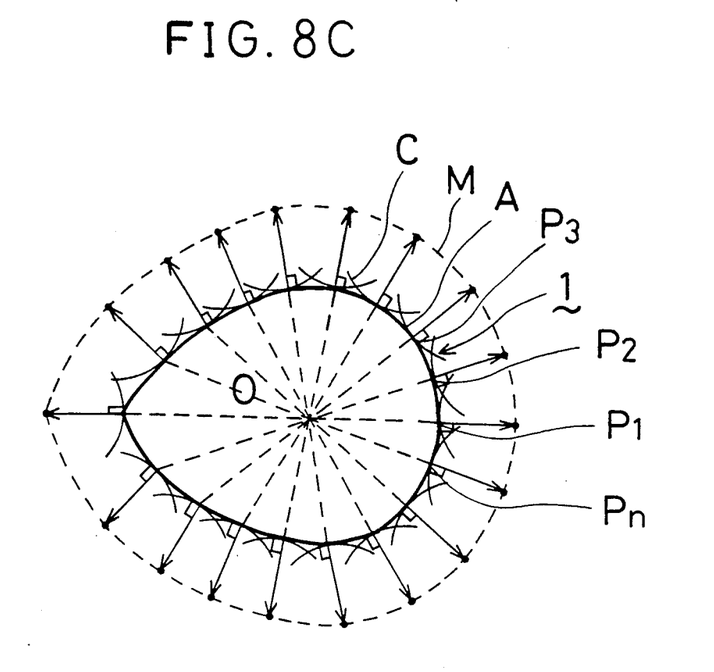
FIG. 8C is an explanatory view for illustrating a method for obtaining profile data from lift data.
Figure 8D:
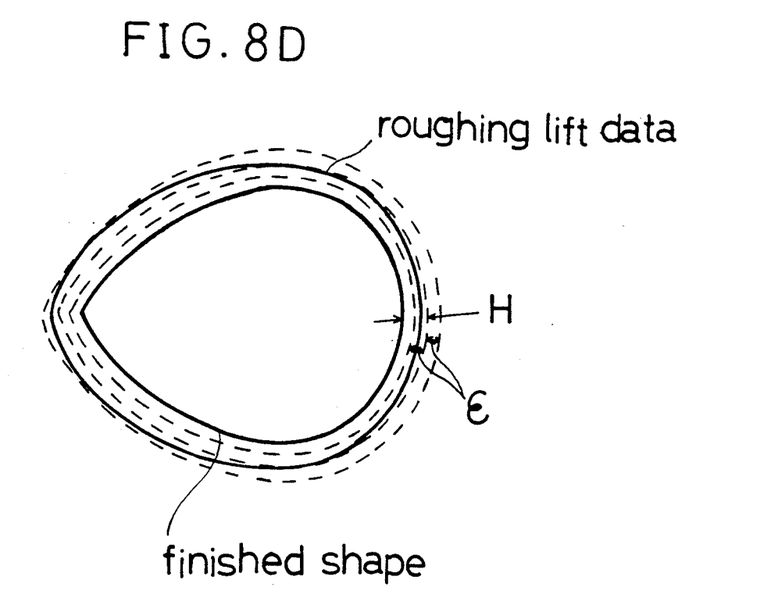
FIG. 8D is an explanatory view showing the relationship of cam shapes by roughing lift data and finishing lift data.

The profile data are obtained as shown in FIG. 8C.

At discrete points $P_1$, $P_2$, ..., $P_n$ at equicentral angle on a contour line of the cam 1, a locus of the center M of a circle C of radius R(grindstone diameter) contacting the contour line A is obtained, and then the profile data indicating the grinding wheel position at every equicentral angle are obtained from the distance between the center M and the center O the cam 1. The roughing profile data are stored in the roughing profile data area 723 and then the data stored are transmitted to the roughing NC profile data area 321 via the front CPU71 and Main CPU31 at actual machining of the cam.

As the roughing profile data were thus prepared, the CPU71 moves it procedure to Step 124 to prepare finishing profile data, wherein the present apparatus is set in a finishing data preparing mode and the CPU71 returns its procedure to Step 104.

Then, it is determined NO in Step 104, and the CPU71 moves its procedure to Step 126 to smooth the lift data as finishing data taking into account of the finishing tolerance stored in the finishing tolerance data area 727. This smoothing is as same as the smoothing procedures in preparing roughing lift data, except that the finishing tolerance is set smaller as compared with the rough tolerance and determination for the acceleration is not executed. The finishing lift data thus obtained are stored in the finishing lift data are 724.

Next, the CPU71 moves its procedure to Step 130 to read the existing grindstone diameter stored in the grindstone diameter data area 729, and then in Step 132, finishing profile data are obtained from the existing grindstone diameter and the finishing lift data stored in the finishing lift data area 724 in the same manner as preparing the aforesaid roughing profile data, and the finishing profile data are stored in the finishing profile data area 725 for CPU71 to complete all procedures of the present program.

When the deviation does not still present within the rough tolerance and the acceleration stays above the set value, even by increasing and decreasing the number of points to be smoothed and by increasing and decreasing the order of the regression polynomial, the rough tolerance or the acceleration set value must be changed.

When the number of points to be smoothed is increased or decreased discretely, there are instances where it is increased or decreased excessively at a time, so that in such case, the procedure of CPU71 may be returned to Step 108 after the number of points to be smoothed is decreased or increased slightly again.

Now processings at grinding will be described.

Figure 5:
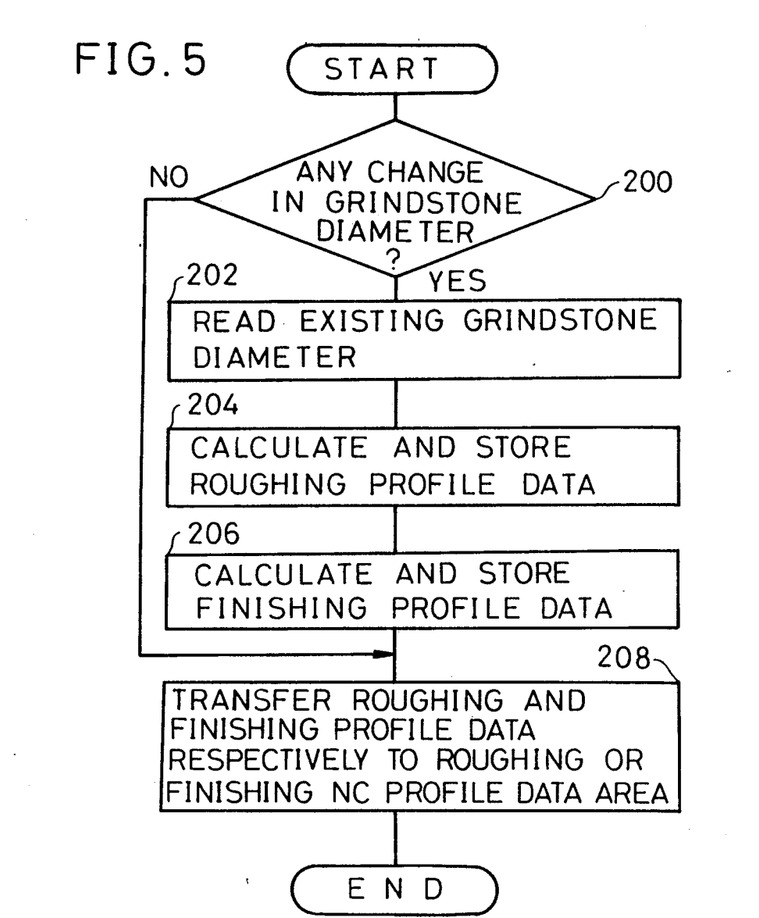
FIG. 5 is a flow chart showing processing procedures of a front CPU71 when a workpiece machining mode is set.

When the apparatus is set in a workpiece machining node, the front CPU71 executes the program of FIG. 5.

In Step 200, it is checked whether the grindstone diameter has changed, if it has changed, profile data must be obtained newly. Thus, the CPU71 moves its procedure to Step 202 to read the existing grindstone diameter stored in the grindstone diameter data area 729, and in next Step 204, roughing profile data are calculated from the existing grindstone diameter and roughing lift data stored in the roughing lift data area 722 and stored in the roughing profile data area 723.

Next, the CPU71 moves to Step 206 to calculate finishing profile data from the existing grindstone diameter and finishing lift data stored in the finishing lift data area 724 so as to be stored in the finishing profile data area 725.

Then, the CPU71 moves its procedure to Step 208, wherein the roughing profile data stored in the roughing profile data area 723 and the finishing profile data stored in the finishing profile data area 725 are transferred to the roughing NC profile data area 321 or the finishing NC profile data area 322 via the front CPU71 and main CPU31 for actual machining of the cam to complete the program.

Here, since the profile data are not necessary to be prepared newly if the grindstone diameter has not changed in Step 200, the CPU71 moves its procedure to Step 208 to transfer the roughing profile data stored in the roughing profile data area 723 and the finishing profile data stored in the finishing profile data area 725 as the initial values and to complete the program.

Figure 6:
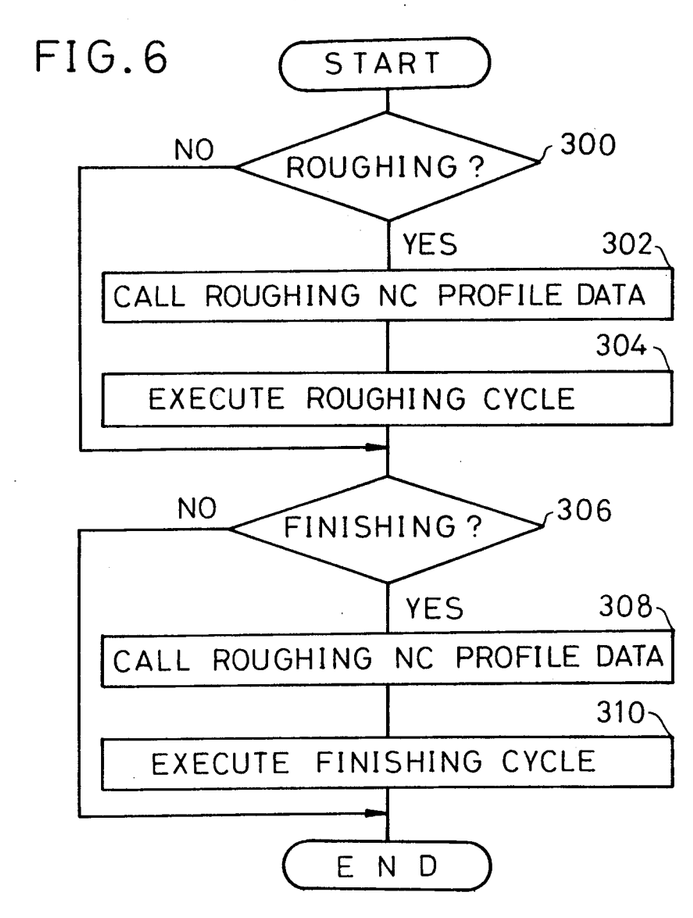
FIG. 6 is a flow chart showing processing procedures of a main CPU31.

Then, if the machining command signal is given from an operation panel 45, the main CPU31 executes the program of FIG. 6.

In Step 300, the CPU31 reads NC data to determine whether roughing is commanded, if it is commanded, the CPU31 moves its procedure to Step 302, wherein roughing NC profile data stored in the roughing NC profile data area 321 are called, then moves to Step 304 to execute cam grinding of the roughing cycle by the roughing command outputted according to the NC profile data.

Then, in Step 306, the CPU31 reads NC data to determined whether finishing is commanded, if it is commanded, the CPU31moves its procedure to Step 308, wherein finishing NC profile data stored in the finishing NC profile data area 322 called, then moves to Step 310 to execute cam grinding of the finishing cycle by the finishing command outputted according to the NC profile data and to complete the program.

When the roughing is not commanded in Step 300, the CPU31 moves to Step 306 to execute the following finishing program, and when finishing is not commanded in Step 306, the program is completed.

In the embodiment aforementioned, though regression curves are obtained respectively in respective angle area $D_i$ which moves by an infinitesimal angle, one regression polynomial of higher order which approximates the point sequence may be obtained throughout whole angle ranges except for the base circle of the cam to generate the all roughing lift data from the regression polynomial.

Though one roughing lift data is generated at the central angle $\theta_i$ of one regression curve in the angle area $D_i$ to shift the angle area $D_i$ by a minimum angle which generates the roughing lift data, the roughing lift data may be obtained at two or three central angles in the angle area $D_i$ to shift the angle area $D_i$ by the angle of two or three times the minimum angle which generates the roughing lift data. By arranging in such a manner, a fast-speed smoothing is realized.

As described hereinabove, in the present invention, smooth roughing lift data whose deviation against the lift data is within a tolerance of the finishing allowance at finishing and quadratic differential components relative to the rotational angle, or acceleration components are below the present value are obtained to prepare roughing profile data therefrom, preparing finishing profile data from the lift data and controlling a main spindle and a grinding wheel feed shaft numerically, by the roughing profile data at roughing and the finishing profile data at finishing. Accordingly, since machining is performed by the roughing profile data wherein the acceleration components are restrained at roughing, follow-up for the command value is good even when increasing the revolution speed of the main spindle, thus uncut machining errors are minimized. As the acceleration components of the roughing profile data are small, a high-speed heavy cutting can be performed, thus eliminating cracks of the workpiece caused by heating. While, at the finishing cycle, since precise machinings can be effected by finishing profile data by reducing the revolution speed of the main spindle, machining errors can be minimized even when the acceleration components are large. Even at low-speed finishing, the roughing can be performed at high speed, as a result, the total machining time including roughing and finishing can be shortened.

What is claimed is:

1. A numerical control apparatus for machining non-circular workpieces comprising:
   lift data storing means for storing lift data specifying the finishing shape of a workpiece, said lift data having quadratic differential components relative to the rotational angle of said workpiece;
   roughing lift data preparing means for obtaining roughing lift data from said lift data stored in said lift data storing means, said roughing lift data having quadratic differential components relative to the rotational angle of said workpiece smaller than those of said lift data;

rouging lift data storing means for storing said roughing lift data prepared by said roughing lift data preparing means;

first profile data preparing means for preparing roughing profile data regulating feed movement of a grinding wheel relative to rotation of a main spindle at roughing, from said roughing lift data stored in said roughing lift data storing means and the diameter of said grinding wheel;

second profile data preparing means for preparing finishing profile data regulating feed movement of said grinding wheel relative to rotation of said main spindle at finishing, from said lift data stored in said lift data storing means and the diameter of said grinding wheel;

first control means for controlling rotation of said main spindle and feed movement of said grinding wheel numerically to perform rough grinding at a high speed on the basis of said roughing profile data; and second control means for controlling rotation of said main spindle and feed movement of said grinding wheel numerically to perform finish grinding at a speed lower than said high speed on the basis of said finishing profile data.

2. A numerical control apparatus for machining non-circular workpieces according to claim 1 further comprising, roughing profile data storing means for storing the roughing profile data generated by first profile data preparing means, and finishing profile data storing means for storing the finishing profile data generated by second profile data preparing means.

3. A numerical control apparatus for machining non-circular workpieces according to claim 1, wherein said roughing lift data preparing means obtains a regression curve which approximates a sequence of points given by said lift data to prepare said roughing lift data from points on the regression curve.

4. A numerical control apparatus for machining non-circular workpieces according to claim 3, wherein said roughing lift data preparing means obtains a regression curve which approximates a sequence of points given by said lift data present in a predetermined narrow angle area, and one of said roughing lift data from the central point in said angle area on said regression curve, to generate all roughing lift data as shifting said angle area by certain angle and executing such processings sequentially.

5. A numerical control apparatus for controlling non-circular workpieces according to claim 4, wherein said roughing lift data preparing means narrows said angle area to decrease the number of points of said points sequence given by said lift data sequentially, until the deviation between said all roughing lift data generated and said lift data presents within the preset tolerance.

6. A numerical control apparatus for machining non-circular workpieces according to claim 4, wherein said roughing lift data preparing means widens said angle area to increase the number of points of said point sequence given by said lift data, or thinning out points with large rate of change, until quadratic differential components become less than a predetermined value for obtaining said regression curve.

7. A numerical control apparatus for machining non-circular workpieces according to claim 3, wherein said roughing lift data preparing means obtains said regression curve by a regression polynomial.

8. A numerical control apparatus for machining non-circular workpiece according to claim 7, wherein said roughing lift data preparing means increases order of said regression polynomial sequentially, until the deviation between said all roughing lift data generated and said lift data presents within the preset tolerance.

9. A method for machining a non-circular workpiece with a numerical control apparatus comprising the steps of:

inputting in a memory lift data specifying the position change of a non-circular surface of said workpiece with respect to rotation of said workpiece, said lift data having quadratic differential components relative to the rotational angle of said workpiece.

obtaining roughing lift data from said lift data, said roughing lift data having deviations against said lift data within a preset tolerance and having quadratic differential components relative to the rotational angle of said workpiece smaller than those of said lift data;

preparing roughing profile data regulating feed movement of a grinding wheel relative to rotation of a main spindle supporting said workpiece during rough grinding, from said roughing lift data and the diameter of said grinding wheel;

preparing finishing profile data regulating feed movement of said grinding wheel relative to rotation of said main spindle during finish grinding, from said lift data stored in said memory and the diameter of said grinding wheel;

controlling rotation of said main spindle and feed movement of said grinding wheel to perform rough grinding at a high speed on the basis of said roughing profile data; and controlling rotation of said main spindle and feed movement of said grinding wheel to perform finish grinding at a speed slower than said high speed on the basis of said finishing profile data.

* * * * *